United States Patent [19]

Lippold

[11] Patent Number: 5,089,202
[45] Date of Patent: Feb. 18, 1992

[54] METHOD FOR THE PRODUCTION OF A FILTER CARTRIDGE

[76] Inventor: Hans-Joachim Lippold, Wredeweg 8, D-1000 Berlin 22, Fed. Rep. of Germany

[21] Appl. No.: 524,541

[22] Filed: May 17, 1990

[30] Foreign Application Priority Data

May 19, 1989 [DE] Fed. Rep. of Germany ....... 3916838

[51] Int. Cl.⁵ .............................................. B29C 53/06
[52] U.S. Cl. ....................................... 264/145; 55/521; 55/527; 264/310; 264/322; 264/DIG. 48
[58] Field of Search ................. 55/521, 497, 492, 527, 55/528; 264/322, 280, 310, 145, 146, 154, 155, 282, 283, DIG. 48; 425/294; 210/493.1, 493.5

[56] References Cited

U.S. PATENT DOCUMENTS

| | | | |
|---|---|---|---|
| 3,112,184 | 11/1963 | Hollenbach | 55/521 X |
| 3,189,179 | 6/1965 | McMichael | 210/493.1 X |
| 3,388,536 | 6/1968 | Nash | 55/492 |
| 3,392,843 | 7/1968 | Mumby | 210/457 |
| 3,520,417 | 7/1970 | Durr et al. | 210/493.1 |
| 3,531,920 | 10/1970 | Hart | 55/497 |
| 4,041,203 | 8/1977 | Brock et al. | 428/157 |
| 4,268,290 | 5/1981 | Barrington | 55/521 |

FOREIGN PATENT DOCUMENTS

| | | |
|---|---|---|
| 1930715 | 11/1970 | Fed. Rep. of Germany. |
| 2813356 | 10/1978 | Fed. Rep. of Germany. |
| 2427123 | 12/1979 | France. |
| 2470630 | 6/1981 | France. |
| 54-34475 | 3/1979 | Japan .......................... 264/DIG. 48 |

Primary Examiner—Richard L. Chiesa
Attorney, Agent, or Firm—Spencer & Frank

[57] ABSTRACT

Filter cartridge, in particular with a block-like shape, having a plurality of fold walls created by folding a permeable filter medium in a zig-zag fashion and which is provided with offsets formed by scoring so that a medium to be filtered passes through from one edge area of the zig-zag folding in the direction of the edge area of the folding on the opposite side. The offsets of adjacent fold walls which face one another contact each other as spacers and the filter medium is at least hardenable in the region of said offsets under the influence of heat. The permeable filter medium has fibres of thermoplastic material and the configuration of the fibres becomes more compact. The rigidity of the filter medium is increased by the welding of the filter medium under the influence of heat in the region of the offsets.

8 Claims, 5 Drawing Sheets

METHOD FOR THE PRODUCTION OF A FILTER CARTRIDGE

CROSS REFERENCE TO RELATED APPLICATION

This application claims the priority of Federal Republic of Germany Application No. P 39 16 838.7 filed May 19th, 1989, which is incorporated herein by reference.

BACKGROUND OF THE INVENTION

This invention relates to filter cartridges and a method for their production.

Such a known filter cartridge for the filtering of gases, in particular for the filtering of air is described in the German Offenlegungsschrift 19 30 715 a counterpart to U.S. Pat. No. 3,531,920. The filter cartridge comprises a filter medium which is hardenable. Furthermore, the filter medium is folded in a zig-zag fashion and is fitted in a rectangular frame. During the filtration process the medium to be filtered passes through the fold wall from one edge area of the zig-zag folding in the direction of the edge area of the folding on the opposite side. Offsets extend out on both sides of the plane of the fold walls of the zig-zag folding. The offsets in the fold walls are arranged in such a way that an offset in the form of a raised portion on one fold wall is in contact with an offset in the form of a raised portion on the adjacent fold wall. Due to the zig-zag folding the offsets of the fold walls are in contact with each other and are supported in the region of the contact area.

A drawback of this arrangement is that the filter medium comprises plastic resin or some other hardenable material. This leads to the filter characteristics of the filter medium being restricted due to the increased pressure difference which occurs due to the insertion or layering of the filter medium with the self-hardening material. The binder, in particular in the form of plastic resin, which is introduced into the filter medium so as to increase the stability thereof leads to a decrease in the permeability of the filter. Greater forces, an increased noise-level and a shorter operational life-span of the filter are the consequence. Furthermore the production of the filter medium is complicated as the binder or the plastic resin has to be introduced in addition.

A further filter medium comprising plastic fibres is described in the German Offenlegungsschrift 28 13 356 which has a high permeability but a low form stability. A drawback of this filter medium is that it cannot retain its formed shape due to the wad-like consistency and the minimal lateral and longitudinal rigidity thereof.

SUMMARY OF THE INVENTION

It is an object of the invention to provide a filter cartridge of the above-mentioned type, in which in a simple manner a stable lasting shape of the filter cartridge can be achieved, whilst at the same time ensuring that the advantageous filter characteristics of the unshaped regions remain.

The above and other objects are accomplished according to the invention by utilizing the realization that by introducing, at least in part, some thermoplastic fibres a stable lasting shape and regions of higher rigidity in the filter layer can be achieved by heat treatment carried out by welding. Even though the welding increases the material density the filter characteristics of the filter material or medium remain essentially unimpaired in those areas most relevant, i.e. in those areas through which the medium to be filtered passes through.

Due to the possible binding together of individual filter layers by thermal adhesion the separation of individual layers can be prevented and the lateral and longitudinal rigidity can be improved, so that the filter media treated according to the invention are foldable and usable for the normal filter uses.

The thermoplastic fibres are not thermally treated or only treated to such an extent in the (not scored) areas, which are those areas in which the main throughput of the medium to be filtered takes place, so as not to influence the filter characteristics negatively. The scored bars in the scored regions, which enable the filter medium to be spaced apart in the required fashion when folded in a zig-zag manner, are given the required rigidity so that a lasting shape of the filter medium can be retained until the end of its operational life-span. In this manner, by carrying out a simple operation, regions of greater shape rigidity can be created in a relatively soft and flexible medium without having to use additional material consisting of another basic material. The spatial distribution of the measures carried out to increase the rigidity is exactly in accordance with the loading requirements. In the advantageous embodiments of the invention folds for fold edges or rib-like rigid areas can be created simultaneously. The compression under the influence of heat can take place in differing grades, whereby in the extreme case to create complete compression no more air voids remain in the filter layers.

An additional advantage is that a possible weakening of the material due to the scoring process can not only be compensated for but can be balanced by a local increase in rigidity.

The filter media consist of plastic fibre material and have a higher filter efficiency and lower pressure differences than the usual glass fibre materials. This results in a lower required throughput and a longer operational life-span of the filter cartridges. In addition a reduction of the required throughput leads to a reduction in noise of the motor means. It is furthermore advantageous that by scoring the offsets into the filter medium the fold walls have a good stability despite their smaller wall thickness. The filter area can therefore be increased by using a smaller number of offsets. The resistance to flow is also lowered and a homogeneous type of flow is guaranteed. This results in a lower suction rate, a less noisy filter and a longer operational life of the filter cartridge.

The filter medium can be produced by machines automatically due to the lasting shape stability achieved by welding.

The thermoplastic and in part welded fibres cause the stability and the rigidity of the filter cartridge to be increased in certain regions, in particular at the offsets, in areas of transition and at the fold edges. The reduction in the number of offsets due to this is also advantageous as a favorable relationship can be achieved between the effective filter surface area and the total surface area of the fold walls. Furthermore additional local regions of increased rigidity can be introduced in accord with the flow characteristics. The filter cartridges can thus be produced as disposable filters at a low cost and have a long operational life-span. The filter walls are of a thermoplastic material and do not require fixed spacers or stiffeners of non-filter material.

The following features are in particular advantageous:

Seam-like regions situated inside the filter medium can be created by welding together the fibres in that region by introducing certain pressure and/or temperature conditions. In the welded state the fibres are connected together without any appreciable air voids. The permeable filter medium is multi-layered whereby individual layers are welded together in part so as to prevent the individual layers from separating. It is furthermore advantageous if the permeable filter medium consists of fibres, or at least fibre parts, such as polypropylene, cellulose, polycarbonate, polyamide, Teflon and/or (polymerized tetrafluoroethylene) polyester. At least one of the outer layers of the multi-layered filter medium comprises a film-like, protective layer with sieve-like perforations which protects the fibres of the inner layers from mechanical abrasion. The protective layer can itself also consist of a thermoplastic material. This composition ensures that there is a sufficient amount of thermoplastic material in the filter medium and that the filter characteristics are suited to the requirements. It is advantageous to construct the seam-like welded regions in the form of joint lines. In addition the offsets comprise seam-like regions of increased rigidity. The offsets of two adjacent fold walls which lie in contact with each other are preferably welded together. In this way the rigidity of the filter cartridge is increased without having to apply additional adhesive material to the filter cartridge for adhesion or stiffening purposes. Furthermore a homogeneous, uniform material surface structure of the filter medium is guaranteed.

It is furthermore advantageous if the film-like filter medium is provided with seam-like regions by heating designated areas at a defined temperature and pressure silmultaneously or in sequence with rollers or presses. In these regions the configuration of the thermoplastic fibres regionally becomes more compact and is welded and the filter medium thus has an improved longitudinal and lateral rigidity. At first, seam-like, in particular the lateral seam-like regions are produced by welding and then the formations, essentially the offsets, are produced by thermally scoring the filter medium. Then the filter medium is folded so that the adjacent offsets facing each other contact each other. The offsets can be heated and partially welded prior to folding with a heating means to such an extent that the liquified parts of the surface area of the offsets are only finally welded together, compacted and hardened when the filter medium has been folded and the partially welded, adjacent offsets have come to lie in contact with each other. The heat energy is advantageously regionally provided to the filter medium by an infra-red source, an ultrasonic source, a laser beam and/or, in particular heating elements of a ridge-, roller-, or press-like form.

The filter medium obtains the required rigidity by way of the compacting of the fibre configuration and the welding. In this way it can be folded and stuck together without any very complicated production technology. In addition the lateral seam-like regions act as bending guides or joint lines during folding. Furthermore, due to the thermal and mechanical treatment in the region of the fold edges, i.e. in the lateral seam-like region, a protrusion of the fibres out of the filter medium and a breaking away of the fibres of the filter medium is prevented.

BRIEF DESCRIPTION OF THE DRAWINGS

FIG. 1b is a plan elevation of the filter medium according to FIG. 1a.

DESCRIPTION OF THE PREFERRED EMBODIMENTS

Figure 1A:
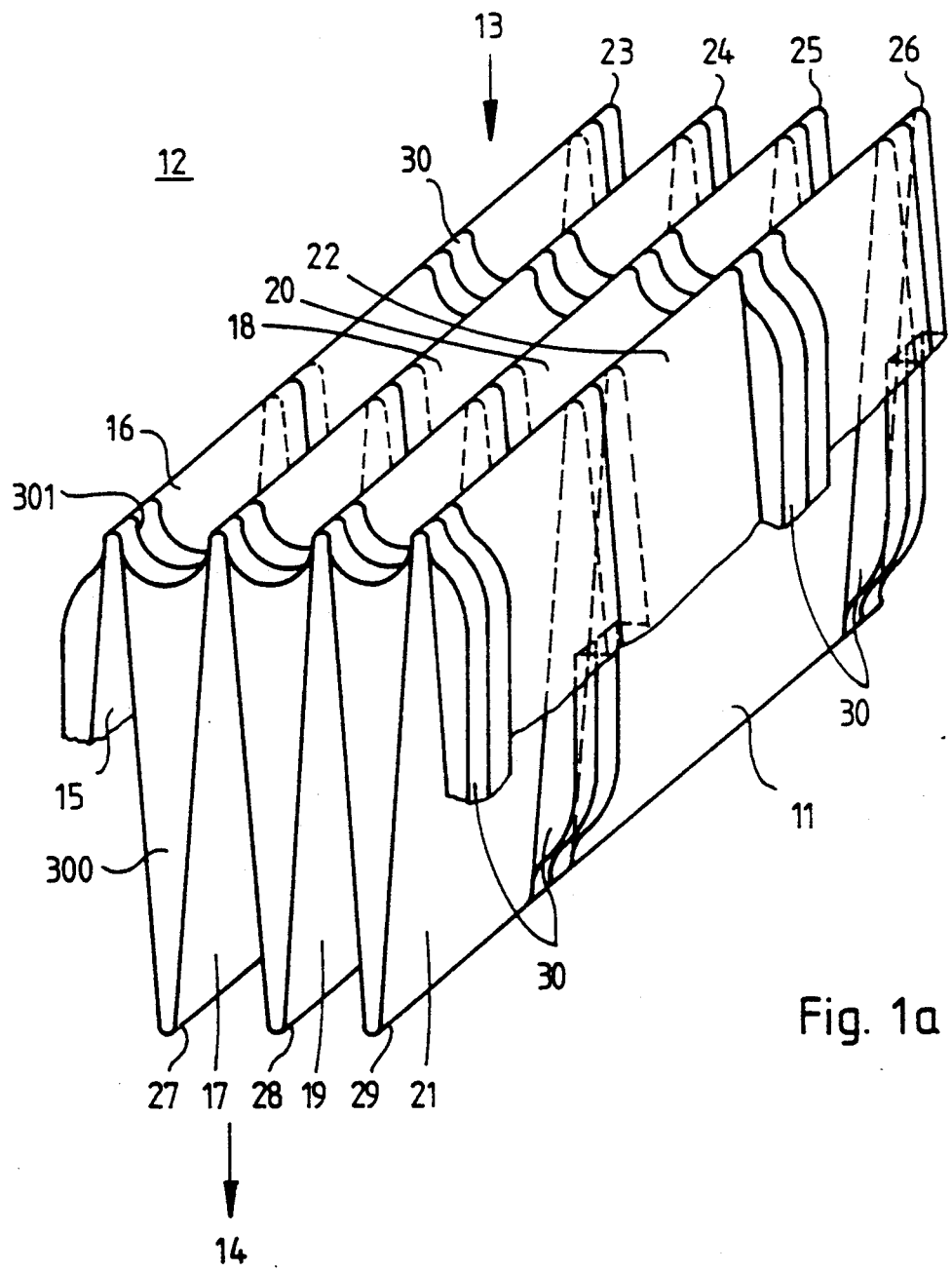
FIG. 1a is a perspective view of a part of a preferred embodiment of the filter medium.
Figure 1B:
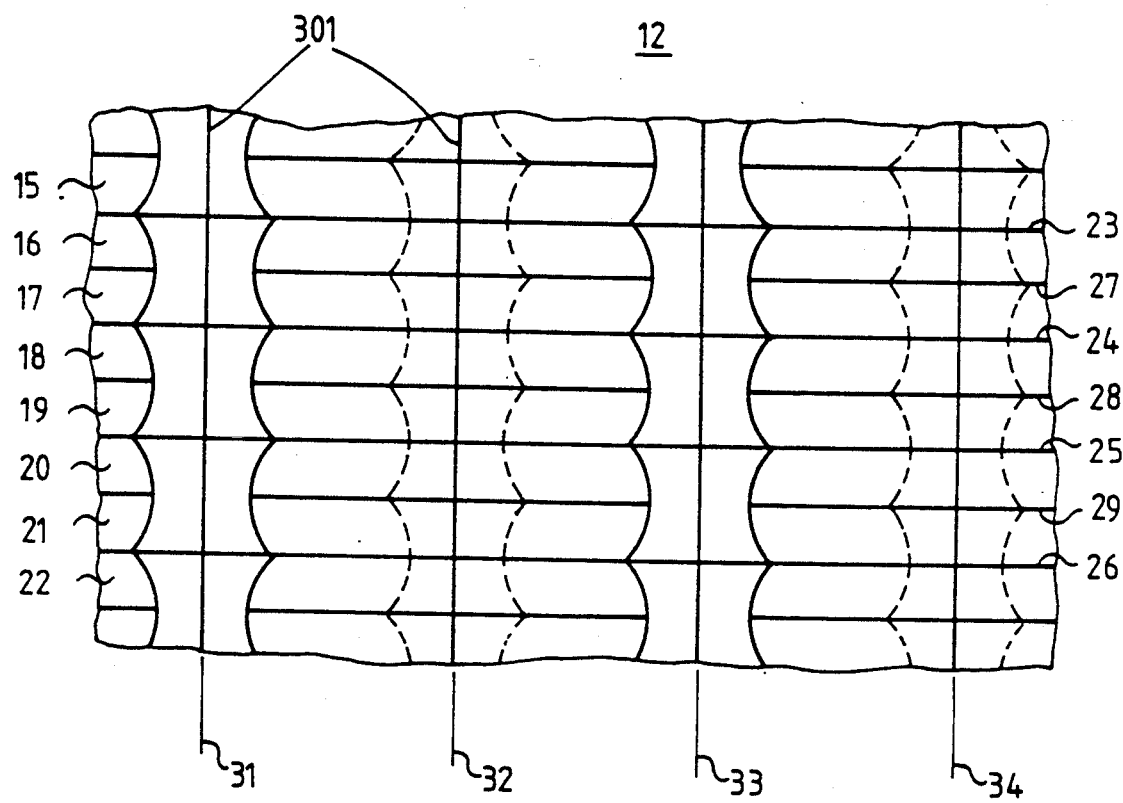

Turning to the FIGS. 1a and 1b, a part of the preferred embodiment of the filter medium 11 consisting of a filter material comprising fibres of a thermoplastic material is shown, which can, by zig-zag folding, be formed into a block-like filter cartridge 12.

The block-like filter cartridge 12 fits in a known way into a frame, which further stabilizes the filter cartridge 12. The filter cartridge can, according to the required use, also be constructed in a frameless fashion in which case the outer measurements are constructed in accordance with the recess into which the filter cartridge 12 is to be fitted. The medium to be filtered flows from the entrance side 13 through the filter cartridge in the direction of the exit side 14 on the opposite side from where it is either extracted via an extraction pipe or flows out freely.

The filter medium 11 is folded in a zig-zag fashion in which a number of fold walls 15 to 22 form one fold each. The fold walls 15 and 16 are connected together by a fold 23 on the entrance side 13. The fold walls 17 and 18 are similarly connected together by a fold 24, the fold walls 19 and 20 by a fold 25 and the fold walls 21 and 22 by a fold 26. The fold walls 16 and 17 are connected together by a fold 27 on the exit side 14. The fold walls 18 and 19 are similarly connected together by a fold 28 and the fold walls 20 and 21 by a fold 29. The folds 23 to 29 form the relative fold edges 23 to 29. This folding enlarges the filter surface area and thereby enhances the filter efficiency of the filter cartridge 12. This is caused by the optimization of the acceleration distribution and the reduction of the pressure difference. The operational life-span is longer than that of the usual equivalent filters.

The fold walls 15 to 22 have offsets 30 made of the same material, which are created by scoring the filter medium 11. The offsets 30 are of constant width in the direction of flow of the medium to be filtered. The width is smaller than the greatest height of the offsets as measured from the plane of the panel fold wall. The side faces 300 of the offsets 30 run vertical to the folds 23 to 29 which connect together the fold walls 15 to 22. The height of the offsets 30 as measured from the plane of the fold walls 15 to 22 constantly increases in the direction away from the folds 27 to 29 towards the folds 23 to 26.

The contact region of the offsets 30 is rectangular in shape. In this way the stability of the filter cartridge is increased. The surface area of the filter element is increased by scoring the fold walls 15 to 22 and the additional material required is obtained from the fold wall to be scored during the scoring operation. The walls of the offsets 30 are therefore thinner.

The thermal hardening according to this invention is applied to the scored regions, i.e. everywhere where the filter medium comprises regions which project out of the plane when the zig-zag folds are stretched out, and will soon be described in greater detail. In this manner rigid bars are formed, which give the filter cartridge a rigid structure. The spacing between adjacent bars can be widened due to the rigidity (and therefore load bearing capacity) of the bars so that the effectivity of the filter cartridge is increased due to the corresponding enlargement of the effective filter area.

The offsets 30 of adjacent fold walls 15 to 22 lie in contact with each other and act as spacers and increase the rigidity. The offsets of adjacent fold walls which face each other are welded together. The height of two offsets 30, which lie in contact with each other, of the fold walls 16 and 17 which are connected together by the fold 27 constantly increases in the direction of the folds 23 and 24 on the opposite side as measured from the plane of the fold walls 16 and 17 respectively. In this way the spacing between the two fold walls 16 and 17 decreases in the direction of flow of the medium to be filtered until the medium to be filtered passes through the respective fold wall 16 or 17 from when on the spacing increases. In this way it is guaranteed that with a laminar flow the whole surface of the filter medium is evenly utilised for filtering and that no pressure variations occur along the path travelled by the medium to be filtered. These could otherwise increase the resistance to flow in an undesirable fashion.

The offsets 30 are situated along the straight lines 31 to 34 which are equally spaced apart from one another. The offsets are situated alternately on either side 13 and 14 in such a way that the offsets 30 are on lines 31 and 33 on the entrance side 13 and the offsets 30 are on lines 32 and 34 on the exit side 14. The stability is greater due to the alternating position of the offsets 30 as the fold walls are not only positioned apart with a set spacing on the entrance side 13 but also on the exit side 14.

The permeable filter medium 11 comprises fibres which are of a thermoplastic material. The amount of thermoplastic fibres present is sufficient to weld regions of the filter medium 11 together by treating them locally with heat. The filter medium 11 thereby itself becomes more dense and more rigid and is connected to material of the same composition.

Seam-like regions, essentially the fold edges 23 to 29 are made by the fibres being welded together under certain pressure and/or heat conditions and are each shaped in the form of a joint line. In this case the fibres are connected together without any appreciable air voids. The permeable filter medium 11 is nevertheless multi-layered, whereby individual layers are welded together in the seam-like regions. The outer layers are of polypropylene which is a thermoplastic material and form a protective layer which is perforated in a sieve-like manner such that the wadding-like polycarbonateous fibres of the inner layers are protected against mechanical abrasion. This configuration means that by thermal treatment the filter characteristics can be adapted to the manufacturing requirements and to the filter process requirements. Regions of the outer and the inner layers of the filter medium can be welded together, compacted and made more rigid.

The initially slightly less stable walls of the offsets 30 caused by the scoring can be made more rigid again by thermal treatment. Also the adjacent offsets 30 which contact each other are welded together due to the influence of heat. The scored offsets 30 comprise longitudinal seam-like, rigid areas 301. By welding the offsets together the rigidity of the filter cartridge 12 is increased without having to apply additional adhesive material to the filter cartridge 12 for adhesion or stiffening purposes. Furthermore a homogeneous, uniform material surface structure of the filter medium 11 is guaranteed.

According to the method of the production of the film-like filter medium it is provided with longitudinal 301 or lateral seams seam-like regions by heating the designated regions at a defined temperature and a defined pressure simultaneously or in sequence with rollers or presses. The lateral seam-like regions form the fold edges 23 to 29. In these regions the configuration of the thermoplastic fibres becomes more compact and are welded. The filter medium 11 thus has an improved longitudinal and lateral rigidity. At first the seam-like, the longitudinal 301 and in particular the lateral seam-like regions which form the fold edges 23 to 29 are produced by welding and then the formations, essentially the offsets 30, are produced by thermally scoring the filter medium 11. The offsets 30 are then heated and partially welded with a heating means to such an extent that the liquified parts of the surface area of the offsets 30 are only finally welded together, compacted and hardened when the filter medium 11 has been folded and the partially welded, adjacent offsets 30 have come in contact with each other. The heat energy is regionally provided to the filter medium 11 by an infra-red source, an ultrasonic source, a laser beam and/or, in particular heating elements of a ridge-, roller-, or press-like form.

The filter medium 11 obtains the required rigidity by way of the compacting and the welding. In this way it can be folded and stuck together without any very complicated production technology. In addition the lateral seam-like regions act as bending guides or joint lines during folding. Furthermore, due to the thermal and mechanical treatment in the region of the fold edges 23 to 29, i.e. in the lateral seam-like regions, a protrusion of the fibres out of the filter medium 11 and a breaking away of the fibres of the filter medium 11 is prevented.

Figure 2:
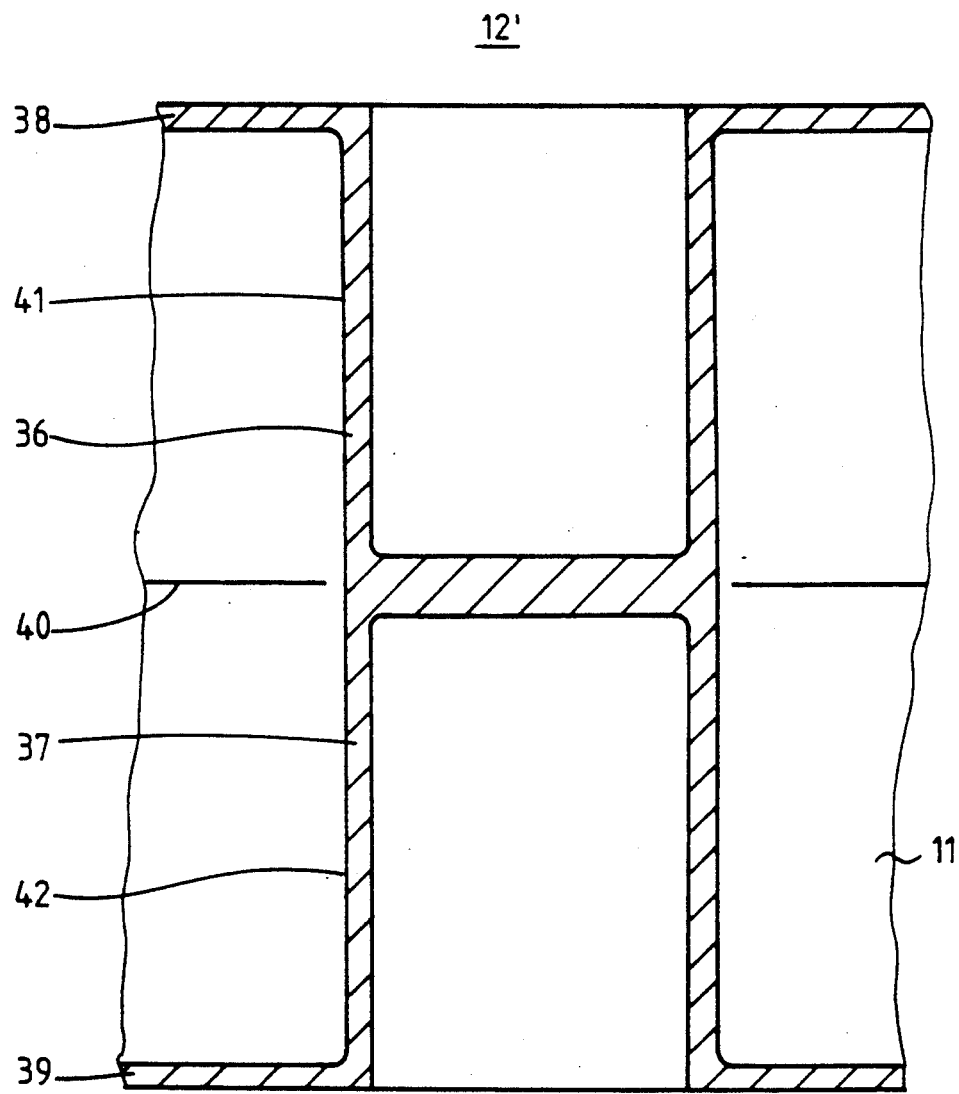
FIG. 2 is an enlargened section through two offsets of the fold walls which contact each other and are welded together.

An enlarged section of two offsets 36 and 37 which contact each other of another embodiment according to the invention is illustrated in FIG. 2 and are scored in the fold walls 38 and 39. The filter cartridge 12 with the scored offsets 36 and 37 is essentially similar to the filter cartridge 12 described in FIGS. 1a and 1b. The height of the offsets 36 and 37 as measured from the plane of the fold walls 38 and 39 increases starting from the fold 40 in the direction of the here not visible opposite fold. The width of each of the offsets 36 and 37 is constant. In this case this width is smaller than the greatest height of the offsets 36 and 37 as measured from the plane of the fold walls 38 and 39.

This filter medium 11 also comprises fibres of a thermoplastic material. The offsets 36 and 37 are welded together. The welding together of both offsets stabilizes the filter cartridge 12 in such a way that the distance between the straight lines on which the offsets 36, 37 and further offsets 30 are situated can be increased. The medium to be filtered flows laminarly due to the flow-advantageous shape of the side walls 41 and 42. The resistance to flow is also lower due to the small number of offsets 30, 36 and 37 and thus less energy is also required for suction or throughput.

Figure 3:
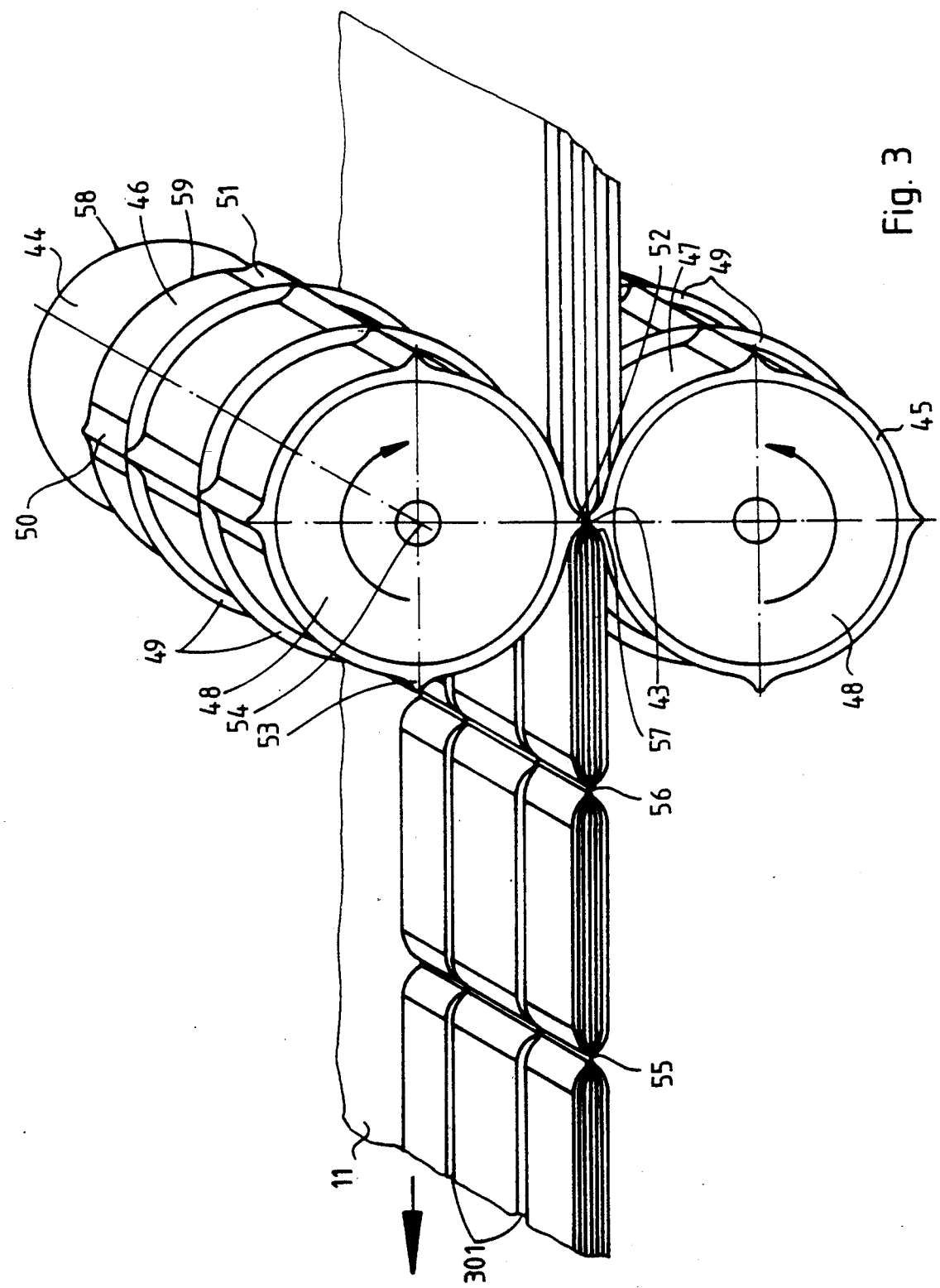
FIG. 3 is a perspective view of the filter medium being manufactured by a partial stage of the preferred process.

In FIG. 3 a partial stage of the method of manufacturing the filter cartridge 12 is illustrated. The multi-layered filter medium 11 is pulled through a roller opening 43 which is made by two scoring rollers 44 and 45. The two scoring rollers 44 and 45 comprise heatable and differently shaped scoring elements. Two scoring rings 49 are located on the surface 46 and 47 of each scoring roller 44 and 45 and are situated in parallel with the side faces 48 of the each of the scoring rollers 44 and 45 and four scoring bars 50 to 53 are located on the surface 46 and 47 of each of the scoring rollers 44 and 45 and are situated parallel to the rotational axis 54 of the scoring roller and at right angles to the neighbouring scoring bars.

As viewed from the rotational axis 54 of the scoring roller the angle between the individual scoring bars 50 to 53 is dependent on the height of the fold walls. The scoring bars 50 to 53 create the lateral seam-like regions 20 on contact with the filter medium 11 by thermally scoring, i.e. by welding together the individual layers consisting of thermoplastic material or the thermoplastic fibres of the multi-layered filter medium 11. These regions act as joint lines, form the fold edges 55 and 56, and are compacted to such an extent that appreciable air voids no longer exist. In this way the filter medium 11 obtains the required lateral rigidity.

The spacing between the scoring rings 49 corresponds to the spacing between the straight lines 31 to 34 as shown in FIG. 1b. The scoring rings 49 act quite similarly to the scoring bars 50 to 53 when the filter medium 11 passes through the roller opening. The only difference is that the seam-like regions created by thermal scoring are continuous in the longitudinal direction and thus provide the filter medium 11 with the required longitudinal rigidity.

The welding treatment of the filter medium 11 varies due to the areas of smaller 58 and larger diameter 59 of the scoring rollers 44 and 45 and the location of the scoring elements. The seam-like regions, the longitudinal seam-like regions 301 and the fold edges 55 to 57 are fully welded, the surface of the filter medium between the fold edges 55 to 57 and the longitudinal seam-like regions 301 are partially welded and the part of the filter medium, which is pulled through the scoring rollers in the area of the smaller diameter 58 undergoes no welding treatment whatsoever. In this way, in correspondence with the shape of the rollers and the scoring elements, regions with differing grades of welding treatment can be continuously created in an advantageous manner.

Figure 4:
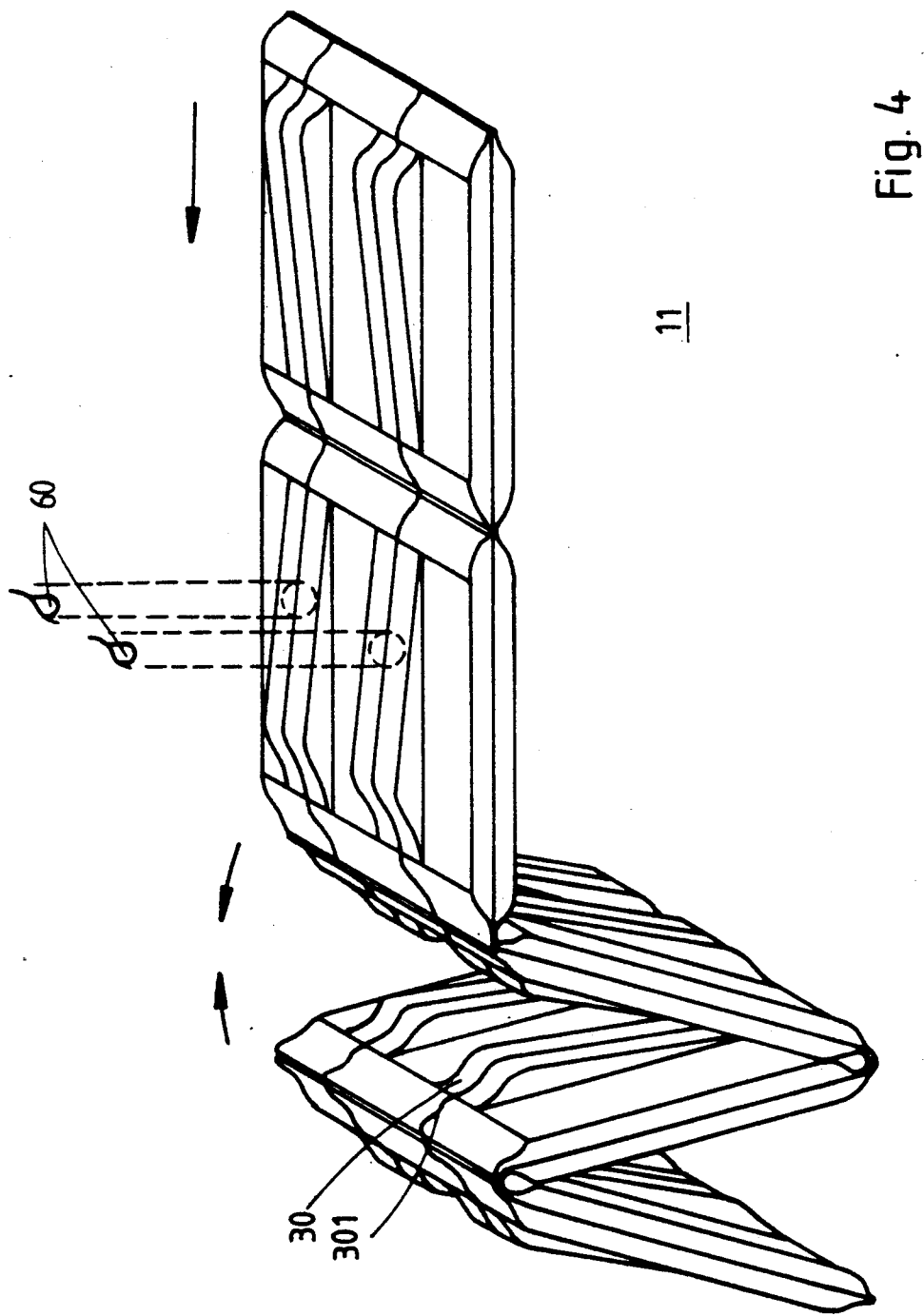
FIG. 4 is a perspective view of the filter medium being manufactured by a further partial stage of the preferred process.

The offsets 30 have been scored into the filter medium 11 which is illustrated in FIG. 4 in the longitudinal seam-like regions. The filter medium 11 corresponds essentially with the already described filter medium 11 illustrated in the FIGS. 1a and 1b. The only difference is that it is not yet in the folded state and the corresponding offsets 30 have not yet been welded together. The welding and folding operation of this filter medium is signified by the motion arrows in this Figure. An infra-red emmitor 60 shines on the surface of the offsets 30 of the filter medium 11 and it is thus heated and partially welded. The filter medium 11 is then directly folded according to the motion arrows illustrated, so that the corresponding offsets lie in contact with each other. The heating due to the infra-red rays is so strong that the corresponding melted surfaces of the offsets 30 only cool down after the surfaces have come in contact with each other and are thus welded together.

It will be understood that the above description of the present invention is susceptible to various modifications, changes and adaptations, and the same are intended to be comprehended within the meaning and range of equivalents of the appended claims.

What is claimed is:

1. A method for the production of a filter, comprising:
   providing a filter material having fibers of thermoplastic material;
   heating only a subregion of the filter material;
   applying pressure to the subregion of the filter material heated in said heating step;
   performing said heating and applying of pressure to the subregion at levels sufficient to compact and weld together the thermoplastic fibers of the subregion for causing the subregion to have a rigidity greater than the rigidity of a region of the filter other than the subregion; said heating and applying of pressure to the subregion comprises forming the subregion into a plurality of offsets which face and contact each other and function as spacers between adjacent ones of the plurality of fold walls when the filter material is folded in a subsequent folding step; and
   folding the filter material in a zig-zag fashion to form a plurality of fold walls.

2. A method as defined in claim 1, wherein said step of performing said heating and applying of pressure to the subregion further comprises forming the subregion into a plurality of fold edges, the plurality of offsets and fold edges rigidifying the filter in lateral and longitudinal directions.

3. A method as defined in claim 1, wherein said step of performing said heating and applying of pressure comprises heating the offsets at a temperature sufficient to melt a surface of the offsets and sufficient to compact and weld together the offsets only when the offsets face and contact each other when the filter material is folded in said folding step.

4. A method as defined in claim 1, wherein said step of performing said heating and applying of pressure to the subregion comprises forming the subregion into a plurality of fold edges.

5. A method for the production of a filter cartridge having a block construction including a plurality of zig-zag fold walls having fold edges between adjacent ones of said plurality of fold walls created by folding a permeable foldable filter material in a zig-zag fashion and which is provided with offsets formed by scoring so that a medium to be filtered passes through from one edge area of the zig-zag fold walls in the direction of the edge area of the opposite side of the fold walls, whereby the offsets of adjacent fold walls which face one another contact each other as spacers and that the filter material is at least hardenable in the region of the offsets under the influence of heat, wherein said permeable filter material includes fibres of thermoplastic material and the configuration of said fibres becomes more compact whereby the rigidity of said filter material is increased by the welding of the filter material under the influence of heat in that region of said offsets, the method comprising:
   providing said filter material with seams by heating only designated areas at a defined temperature and pressure whereby the configuration of said thermoplastic fibres in said seams becomes more compact and said thermoplastic fibres are welded together and said filter material thus has increased longitudinal and lateral rigidity.

6. Method for the production of a filter cartridge as defined in claim 5, further comprising forming and rigidifying said offsets by thermally scoring said filter material, and then folding said filter material so that said adjacent offsets facing each other contact one another.

7. Method for the production of a filter cartridge as defined in claim 6, wherein said forming and rigidifying step comprises heating and partially welding said offsets prior to folding to such an extent that parts of the surface area of said offsets are liquified and only finally welded together, compacted and hardened when said filter material has been folded and said partially welded, adjacent offsets have come in contact with each other.

8. Method for the production of a filter cartridge as defined in claim 5, further comprising providing heat energy regionally to said filter material by either an infra-red source, an ultrasonic source, a laser beam or heating elements selected from the group consisting of ridge, roller, and pressing elements.

* * * * *